United States Patent [19]

Igarashi et al.

[11] Patent Number: 4,942,906
[45] Date of Patent: Jul. 24, 1990

[54] RUBBER HOSE

[75] Inventors: Ichiro Igarashi, Komaki; Kazuhiko Nishimura, Kasugai, both of Japan

[73] Assignee: Tokai Rubber Industries, Ltd., Aichi, Japan

[21] Appl. No.: 283,382

[22] Filed: Dec. 12, 1988

[30] Foreign Application Priority Data

Dec. 16, 1987 [JP] Japan .................. 62-319328

[51] Int. Cl.⁵ .................................... F16L 11/08
[52] U.S. Cl. ..................... 138/126; 138/124; 138/137; 138/141; 138/DIG 3
[58] Field of Search ............... 138/124, 125, 126, 127, 138/137, 141, 145, 146, DIG. 3

[56] References Cited

U.S. PATENT DOCUMENTS

| Re. 32,230 | 8/1986 | Satoh et al. | 138/126 |
| 4,041,207 | 8/1977 | Takada et al. | 138/137 |
| 4,330,017 | 5/1982 | Satoh et al. | 138/137 |
| 4,457,799 | 7/1984 | Dunn | 138/137 |
| 4,603,712 | 8/1986 | Krause | 138/137 |
| 4,633,912 | 1/1987 | Pilkington et al. | 138/137 |
| 4,685,090 | 7/1987 | Krevor | 138/137 |
| 4,759,388 | 7/1988 | Kiyama et al. | 138/137 |

FOREIGN PATENT DOCUMENTS

| 57-5701 | 2/1982 | Japan . |
| 60-33663 | 8/1985 | Japan . |
| 62-278395 | 12/1987 | Japan . |
| 63-19486 | 1/1988 | Japan . |
| 63-218348 | 9/1988 | Japan . |

Primary Examiner—James E. Bryant, III
Attorney, Agent, or Firm—Oliff & Berridge

[57] ABSTRACT

A rubber hose having an outer rubber tube and an inner rubber tube located radially inwardly of the outer rubber tube, the inner rubber tube including an inner layer and an outer layer located between the inner layer and the outer rubber tube, the inner layer being formed of a first polymer blend of acrylic rubber and fluorine-contained resin, the outer layer being formed of a second polymer blend which is different from the first polymer blend and which contains epichlorohydrin rubber. The rubber hose may further have a reinforcing fiber layer disposed between the outer rubber tube and the outer layer of the inner rubber tube such that the inner and outer rubber tubes and the fiber layer constitute an integral tubular body.

6 Claims, 1 Drawing Sheet

U.S. Patent    Jul. 24, 1990    4,942,906 ing gasoline resistance (or resistance to gasoline), a reinforcing fiber layer 102 and an outer rubber tube 103 having weather resistance. Referring further to FIG. 3, a pair of opposite ends of the rubber hose 104 are fitted onto respective metallic pipes 105 and the fitted ends of the rubber hose 104 are tightly fastened to the metallic pipes 105 with the help of respective fastening bands 106.

RUBBER HOSE

BACKGROUND OF THE INVENTION

1. Field of the Invention

The present invention relates generally to a rubber hose and particularly to such a rubber hose suitable for a fuel transporting line in an automotive engine room where the hose connects metal pipes.

2. Discussion of Prior Art

Referring to FIG. 2, there is shown a conventional rubber hose 104 for an automotive fuel line. The rubber hose 104 has a laminated-tube structure consisting of an inner rubber tube 101 hav- Recently, the automobile technology has been largely developed. In consequence, automotive fuel such as gasoline is subjected to high pressure and high temperature for the purpose of regulating exhaust gas. Additionally, the automotive engine room is subjected to an extremely wide temperature variation from lower than −40° C. to higher than 100° C. Gasoline transported through the high temperature engine room tends to be oxidized due to the heat. The gasoline containing peroxides developed due to such heat, is called "sour gasoline". The sour gasoline adversely influences the rubber hoses transporting the fuel. Thus, nowadays, rubber hoses for an automotive fuel line are required to have more excellent properties, so that the hoses can be used in a satisfactory manner under severe conditions. The rubber hoses of the above-indicated type that have an inner rubber tube formed of a widely used polymer resistant to gasoline, cannot be used in automotive vehicles any longer.

Furthermore, gasoline or oil is a limited resource and the resource is expected to be drained out in the future. For coutermeasuring such situation, alcohol may be used as automotive fuel in the form of a mixture with gasoline. However, alcohol is erosive to rubber. In the situation, therefore, there will be needed rubber hoses having an inner rubber tube resistant to alcohol.

In view of the foregoing, it has been recommended that the inner rubber tube of rubber hoses be formed of fluorine-contained rubber (hereinafter referred to as "FKM"), because FKM has excellent heat resistance and sour-gasoline resistance (resistance to sour gasoline). However, FKM suffers from problems of low cool resistance (resistance to low temperature) and high cost of manufacture.

In the above-mentioned background, another rubber hose is available at present, which has a double-layered inner rubber tube consisting of a comparatively thin inner layer formed of the above-indicated FMK and an outer layer formed of a material having excellent low temperature resistance, such as hydrin rubber or acrylonitrile-butadiene rubber (NBR) (specifically, NBR which contains a comparatively small proportion of acrylonitrile and accordingly is excellent in low temperature resistance). However, this rubber hose has the problem of high cost of manufacture, and other problems.

Moreover, there has been developed a polymer blend (complex polymer) consisting of acrylic rubber and fluorine-contained resin, which has excellent sour-gasoline resistance comparable to that of FKM and costs lower than FKM. Since containing a resin, however, the polymer blend exhibits a comparatively high hardness after being cured. In the case where the polymer blend is used for forming an inner layer of an inner rubber tube of rubber hoses, the produced hoses have the problem of low elasticity. Furthermore, the inner layer formed of the blend polymer in question is not bonded with sufficient bonding strength to an NBR-based outer layer of the inner rubber tube, since the polymer blend is not vulcanized with high bonding strength to NBR. Japanese Patent Application laid-open under Publication Number 62(1987)-278395 proposed to add epoxy resin, silica or magnesium oxide to NBR for improving the bonding strength by vulcanization at the interface between the inner and outer layers of the inner rubber tube. However, even the thus produced rubber hoses have a tendency to be peeled at the interface in question during use.

SUMMARY OF THE INVENTION

It is therefore an object of the present invention to provide a rubber hose which is manufactured at low cost and meets all the requirements for use in automotive fuel lines.

The above object has been achieved according to the principle of the present invention, which provides a rubber hose having an outer rubber tube and an inner rubber tube located radially inwardly of the outer rubber tube, the inner rubber tube comprising an inner layer and an outer layer located between the inner layer and the outer rubber tube, the inner layer being formed of a first polymer blend of acrylic rubber and fluorine-contained resin, the outer layer being formed of a second polymer blend different from the first polymer blend, the second polymer blend containing epichlorohydrin rubber.

The inventors have conducted a series of studies for developing the art of preventing peeling or separation at the interface between the inner and outer layers of the inner rubber tube of rubber hoses, the inner layer being formed of a polymer blend of acrylic rubber and fluorine-contained resin, the outer layer being formed of a polymer blend containing NBR, for example. The present invention is based on those studies. The inventors have found that, if the outer layer of the inner rubber tube is formed of a polymer blend (b) which is different from a polymer blend (a) used for forming the inner layer and which contains epichlorohydrin rubber, the inner and outer layers are vulcanized to each other with high bonding or adhesive strength and additionally deterioration of the low temperature characteristic of the inner layer is prevented.

The rubber hose of the present invention as described above, has excellent characteristics, particularly regarding gasoline resistance, sour-gasoline resistance and heat resistance, and additionally the cost of manufacture thereof is comparatively low. Moreover, the inner and outer layers of the inner rubber tube of the hose are vulcanized to each other with sufficient bonding strength. Thus, the rubber hose of the present invention can be used even under severe conditions, and is particularly suitable for use in automotive fuel line where the hoses used therein are required to maintain high seal characteristic for a comparatively long period of time.

In a preferred embodiment of the rubber hose of the present invention, the rubber hose further has a reinforcing fiber layer disposed between the outer rubber tube and the outer layer of the inner rubber tube such that the inner and outer rubber tubes and the reinforcing fiber layer constitute an integral tubular body.

In one embodiment of the rubber hose of the invention, the second polymer blend contains epichlorohydrin rubber and at least one polymer selected from the group consisting of acrylonitrile-butadiene rubber, chlorosulfonated polyethylene, chlorinated polyethylene and acrylic rubber.

In another embodiment of the rubber hose of the invention, the second polymer blend contains 1-50 parts by weight of epichlorohydrin rubber per 100 parts by weight of the second polymer blend.

In yet another embodiment of the rubber hose of the invention, the second polymer blend further contains 15-80 parts by weight of at least one plasticizer per 100 parts by weight of acrylonitrile-butadiene rubber which contains 30-55% by weight of acrylonitrile.

In a still further embodiment of the rubber hose of the invention, the acrylic rubber of the first polymer blend is copolymer rubber produced by copolymerization of at least four monomers, the at least four monomers including (A) at least one first monomer selected from a group consisting of alkyl acrylate and alkyl methacrylate, (B) at least one second monomer selected from a group consisting of substituted-alkyl ester of acrylic acid and substituted-alkyl ester of methacrylic acid, (C) at least one-third monomer selected from a group consisting of diene; acrylate containing dihydrodicyclopentadienyl radical and methacrylate containing dihydrodicyclopentadienyl radical; ethylenically unsaturated monomer containing epoxy radical; and ethylenically unsaturated compound containing active halogen, and (D) at least one fourth monomer selected from a group consisting of other ethylenically unsaturated compound capable of copolymerizing with the above-indicated at least three monomers (A), (B) and (C).

In another embodiment of the rubber hose of the invention, the acrylic rubber of the first polymer blend consists of, as polymerization monomers thereof, 30-80% by weight of the at least one first monomer (A), 20-70% by weight of the at least one second monomer (B), 0.1-10% by weight of the at least one third monomer (C) and 1-30% by weight of the at least one fourth monomer (D).

In yet another embodiment of the rubber hose of the invention, the fluorine-contained resin of the first polymer blend comprises polyvinyl fluoride, polyvinylidene fluoride, tetrafluoroethylene-hexafluoroethylene copolymer, polytetrafluoroethylene, and ethylene-tetrafluoroethylene copolymer.

BRIEF DESCRIPTION OF THE DRAWINGS

The above and optional objects, features and advantages of the present invention will be better understood by reading the following detailed description of the presently preferred embodiment of the invention, when considered in conjunction with the accompanying drawings, in which.

DETAILED DESCRIPTION OF THE PREFERRED EMBODIMENT

Figure 1:
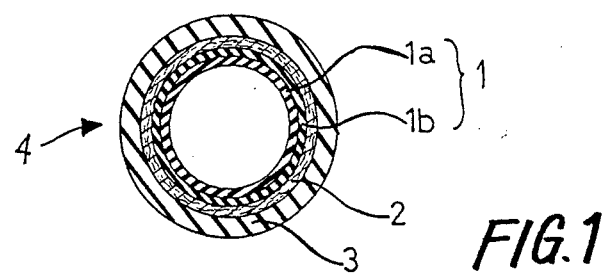
FIG. 1 is a transverse cross sectional view of one embodiment of the rubber hose of the present invention.
Figure 2:
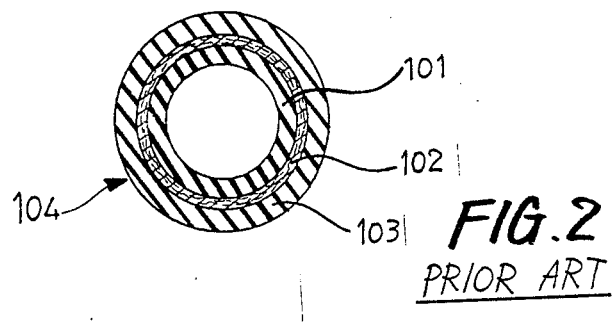
FIG. 2 is a transverse cross sectional view of a conventional rubber hose.
Figure 3:
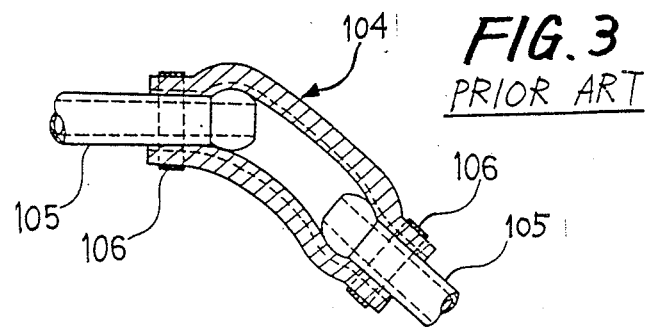
FIG. 3 is a longitudinal cross sectional view of the rubber hose of FIG. 2 when used together with metallic pipes.

The inner layer of the inner rubber tube of the rubber hose of the present invention, is formed of a polymer blend (a) of acrylic rubber and fluorine-contained resin, while the outer layer of the inner rubber tube is formed of a polymer blend (b) different from the polymer blend (a) and containing epichlorohydrin.

As the acrylic rubber used for preparing the above-indicated polymer blend (a), preferably are used copolymer rubbers which are produced by copolymerization of multiple elements, that is, at least four monomers including at least one monomer selected from each of the following four monomers (A) through (D):

(A): alkyl acrylate and alkyl methacrylate;
(B): substituted-alkyl ester of acrylic acid and substituted-alkyl ester of methacrylic acid;
(C): diene; acrylate containing dihydrodicyclopentadienyl radical and methacrylate containing dihydrodicyclopentadienyl radical; ethylenically unsaturated compound containing epoxy radical; and ethylenically unsaturated compound containing active halogen; and
(D): ethylenically unsaturated compound different from the above monomers (A), (B) and (C) capable of copolymerizing with the monomers (A), (B) and (C).

As described above, the above-indicated at least four monomers include at least one monomer selected from each of the above-indicated groups (A) through (D).

The alkyl acrylate and alkyl methacrylate of the monomer (A) is represented by the following general formula (1):

wherein $R_1$ is H or $CH_3$ radical and $R_2$ is alkyl radical.

Preferably, the number of carbon atoms contained in the alkyl radical $R_2$ is within the range of 3 to 8. For example, the monomers (A) include n-butyl acrylate, n-hexyl acrylate, n-octyl acrylate and 2-ethylhexyl acrylate.

Next, the substituted-alkyl ester of acrylic acid and substituted-alkyl ester of methacrylic acid of the monomer (B) is represented by the following general formula (2):

wherein $R_1$ is H or $CH_3$ radical and $R_3$ is substituted alkyl radical.

Preferably, the substituted alkyl radical $R_3$ has a monovalent substituent such as alkoxy radical or cyano radical. As the alkoxy radical substituted alkyl radicals, are preferable alkyl radicals whose number of carbon atoms is within the range of 1 to 4 and which are substituted with alkoxy radicals whose number of carbon atoms is within the range of 1 to 4. Meanwhile, as the cyano radical substituted alkyl radicals, are preferable cyanoalkyl radicals whose number of carbon atoms is within the range of 2 to 12.

The alkoxyalkyl esters of acrylic acid of the monomer (B) include methoxyethyl acrylate, methoxymethyl acrylate, ethoxyethyl acrylate, butoxyethyl acrylate, methoxyethoxyethyl acrylate and ethoxyethoxyethyl acrylate.

The cyanoalkyl esters of acrylic acid or metharylic acid of the monomer (B) include cyanomethyl acrylate, cyanomethyl methacylate, 1-cyanoethyl acrylate, 1-cyanoethyl methacrylate, 2-cyanoethyl acrylate, 2-cyanoethyl methacrylate, 1-cyanopropyl acrylate, 1-cyanopropyl methacrylate, 2-cyanopropyl acrylate, 2-cyanopropyl methacrylate, 3-cyanopropyl acrylate, 3-cyanopropryl methacrylate, 4-cyanobutyl acrylate, 4-cyanobutyl methacrylate, 6-cyanohexyl acrylate, 6-cyanohexyl methacrylate, 2-ethyl-6-cyanohexyl acrylate, 2-ethyl-6-cyanohexyl methacrylate, 8-cyanooctyl acrylate and 8-cyanooctyl methacrylate. Above all, 2-cyanoethyl acrylate, 3-cyanopropyl acrylate and 4-cyanobutyl acrylate are preferable.

As the diene of the monomer (C), preferably are used non-conjugated diene such as alkylidene norbornene, alkenyl norbornene, dicyclopentadiene, methylcyclopentadiene and their dimers; and conjugated diene such as butadiene and isoprene. Above all, is preferable a non-conjugated diene selected from a group consisting of alkylidene norbornene, alkenyl norbornene, dicyclopentadiene, methylcyclopentadiene and their dimers.

As the acrylate containing dihydrodicyclopentadienyl radical and methacrylate containing dihydrodicyclopentadienyl radical of the monomer (C), preferably are used dihydrodicyclopentadienyl acrylate, dihydrodicyclopentadienyl methacrylate, dihydrodicyclopentadienyloxyethyl acrylate and dihydrodicyclopentadienyloxyethyl methacrylate.

As the ethylenically unsaturated compound containing epoxy radical of the monomer (C), preferably are used allyl glycidyl ether, glycidyl acrylate and glycidyl methacrylate.

As the ethylenically unsaturated compound containing active halogen of the monomer (C), preferably are used vinyl benzyl chloride, vinyl benzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxy-methyl-5-norbornene.

As the ethylenically unsaturated compound of the monomer (D), preferably are used monomer containing carboxyl radical, such as acrylic acid, methacrylic acid, crotonic acid, 2-pentenic acid, maleic acid, fumaric acid and itaconic acid; methacrylate such as methyl methacrylate and octyl methacrylate; alkoxyalkyl acrylate such as methoxyethyl acrylate and butoxyethyl acrylate; alkyl vinyl ketone such as methyl vinyl ketone; vinyl such as vinyl ethyl ether and allyl methyl ether; vinyl aromatic monomer such as allyl ether, styrene, α-methyl styrene, chlorostyrene and vinyl toluene; vinyl nitrile such as acrylonitrile and methacrylonitrile; vinyl amide such as acrylamide, methacrylamide and N-methylol acrylamide; vinyl chloride; vinylidene chloride; and alkyl fumarate.

Preferably, the acrylic rubber of the polymer blend (a) contains, as polymerization monomers thereof, 30-80% by weight of the at least one first monomer (A), 20-70% by weight of the at least one second monomer (B), 0.1-10% by weight of the at least one third monomer (C) and 1-30% by weight of the at least one fourth monomer (D).

If the proportion of the monomer (A) is below the lower limit of the above-indicated range therefor, the inner layer formed of the polymer blend (a) suffers from insufficient heat resistance. On the other hand, if that proportion exceeds the upper limit of the range, normal-state characteristics of the inner layer is deteriorated.

If the proportion of the monomer (B) is lower than the lower limit of the above-indicated range therefor, the inner layer is insufficient in gasoline resistance and sour-gasoline resistance. On the other hand, if that proportion exceeds the upper limit of the range, the normal-state characteristics of the inner layer is deteriorated.

If the proportion of each of the monomers (C) and (D) exceeds the upper limit of the above-indicated corresponding range therefor, the inner layer tends to lose the balance among the gasoline resistance, sour-gasoline resistance and heat resistance thereof.

As the fluorine-contained resin of the polymer blend (a), preferably are used polyvinyl fluoride (PVF), polyvinylidene fluoride (PVDF), polytetrafluoroethylene (PTFE), tetrafluoroethylene-hexafluoroethylene copolymer (FEP) and ethylene-tetrafluoroethylene copolymer (ETF).

The polymer blend (a) is mixed with commonly used additives, as needed, such as reinforcing agent, filler, plasticizer, softener, cross linking agent and/or stabilizer. Also, polymer such as polyvinyl chloride or epichlorohydrin rubber may be added to the polymer blend (a) as needed.

The outer layer of the inner rubber tube of the rubber hose of the present invention is formed of the polymer blend (b) different from the above-discussed polymer blend (a) and containing epichlorohydrin rubber.

As the polymer(s), other than epichlorohydrin rubber, used for preparing the polymer blend (b), preferably are used acrylonitrile-butadiene rubber (NBR), chlorosulfonated polyethylene (CSM), chlorinated polyethylene (CPE) and acrylic rubber (ACM). One or more of those polymers are used together with epichlorohydrin rubber to prepare the polymer blend (b).

The NBR used to prepare the polymer blend (b) is not specified with respect to an amount or percentage by weight ("AN amount") of acrylonitrile copolymerized or contained therein. Similarly, the CSM or CPE used in the polymer blend (b) is not specified with respect to an amount of chlorine contained therein.

The epichlorohydrin rubber (CHC) employed for preparing the polymer blend (b) is by no means limited to a specific kind, so long as the CHC contains epichlorohydrin as polymerization unit. In addition to epichlorohydrin contained as the essential polymerization unit, the CHC may contain as optional polymerization unit at least one monomer selected from the group of ethylene oxide, allyl glycidyl ether, and compound capable of copolymerizing with ephichlorohydrin, ethylene oxide and allyl glycidyl ether.

Preferably, the polymer blend (b) contains 1-50 parts by weight of epichlorohydrin rubber per 100 parts by weight of the overall polymer blend (b), that is, the epichlorohydrin rubber and the above-indicated other polymers).

The polymer blend (b) is mixed, as needed, with one or more conventionally used plasticizers selected from the group of synthesized plasticizer such as dibutyl phthalate (DBP), octyl phthalate (DOP) and tricresyl phosphate (TCP); and polyol-type plasticizer such as ethylene glycol. It is recommended that 15-80 parts by weight of the plasticizer(s) be used together with 100 parts by weight of NBR which contains 30-55% by weight of acrylonitrile (namely, the AN amount of the NBR is 30-35%). In this case, bleeding of the plasticizer(s) from the inner layer into the outer layer due to a concentration gradient therebetween is prevented.

The polymer blend (b) is mixed with other materials such as reinforcing agent, filler, softener, cross linking agent and stabilizer, as needed.

The rubber hose has a reinforcing fiber layer formed on an outer surface of the outer layer which is formed of the specific polymer blend (b) containing CHC, which layer is formed on an outer surface of the inner layer formed of the blend polymer (a) of acrylic rubber and fluorine-contained resin, the inner and outer layers co-operating with each other to constitute the inner rubber tube. The rubber hose further has an outer rubber tube formed on an outer surface of the reinforcing fiber layer.

The reinforcing fiber layer is formed in a conventionally employed manner by braiding, spiralling or knitting using synthetic fiber such as polyester fiber or aramid fiber, or natural fiber such as cotton fiber.

The outer rubber tube is formed of commonly used material. From the standpoint of weather resistance, heat resistance and water permeability, the outer rubber tube preferably is formed of ethylene-propylene-diene rubber (EPDM) or CHC.

There will be described a method of manufacturing the rubber hose as described above.

First, the blend polymer (b) containing CHC is kneaded by a cooling roller, while the blend polymer (a) of acrylic rubber and fluorine-contained resin is kneaded in the same manner. The kneaded blends (a) and (b) are used to concurrently extrude an inner and an outer layer of an inner rubber tube. Alternatively, the kneaded blends (a) and (b) are extruded by two extruders to form an inner layer and subsequently an outer layer onto the inner layer, respectively. Next, a reinforcing fiber layer is formed on an outer surface of the outer layer of the inner rubber tube. Last, an outer rubber tube is extruded onto an outer surface of the reinforcing fiber layer. The thus obtained tubular body is subjected to vulcanization to adhere the four laminates (three layers and one tube) to each other, whereby the integral tubular body or hose is produced. The vulcanization temperature is selected at 145°-170° C., and the vulcanization period is selected at 30-90 minutes.

The thus produced rubber hose is shown in FIG. 1. In the figure, reference 1a designates the inner layer formed of the polymer blend (a) of acrylic rubber and fluorine-contained resin, while reference 1b designates the outer layer formed of the polymer blend (b) containing epichlorohydrin rubber. The inner and outer layers 1a, 1b cooperate with each other to constitute the inner rubber tube 1, whereby the inner tube 1 has a double-layered structure. Reference numeral 3 designates the outer rubber tube, and the reinforcing fiber layer indicated at reference numeral 2 is disposed between the inner and outer tubes 1, 3 such that the inner and outer tubes 1, 3 and the fiber layer 2 constitute an integral tubular body or hose 4.

The rubber hose constructed and manufactured as described above exhibits excellent characteristics, particularly with respect to gasoline resistance, sour-gasoline resistance and heat resistance, and additionally it costs comparatively less. Moreover, the inner and outer layers of the inner rubber tube of the rubber hose, are vulcanized to each other with high bonding strength, and accordingly the rubber hose is free from the problem of the peeling at the interface between the inner and outer layers of the inner rubber tube.

While the present invention has been illustrated in the presently preferred embodiment with particularities, it is to be understood that the present invention may be embodied with various changes, improvements and modifications that may occur to those skilled in the art without departing from the spirit and scope of the invention. Accordingly, the present invention is by no means limited to the following examples prepared for conducting a bonding-strength comparison test.

EXAMPLES

Examples 1 through 7 shown in the TABLE are compositions prepared according to the present invention to be used as material for forming the outer layer (1b) of the inner rubber tube (1) of the rubber hose (4). The compositions of Invention Examples 1-7 contain respective polymer blends indicated in the TABLE. The TABLE also shows Comparative Examples 1 through 5 having respective compositions indicated therein.

Meanwhile, the following composition was prepared for use as material for the inner layer (1a) of the inner rubber tube (1):

| Composition for Inner Layer | (parts by weight) |
|---|---|
| acrylic rubber containing 35% of vinylidene fluoride resin ("FR-11" available from Japan Synthetic Rubber Co., Ltd.) | 100 |
| stearic acid | 1 |
| ISAF carbon | 30 |
| plasticizer ("TP-95" available from Thiokol Chemical Corp.) | 25 |
| vulcanizing agent ("DIAK No. 1" available from E. I. du Pont de Nemours & Co.) | 1 |

Each of the composition for the inner layer and the compositions for the outer layer (Invention Examples 1-7 and Comparative Examples 1-5) was formed into a rubber sheet of a 2 mm thickness by an extruder. Each of the rubber sheets formed of Invention Examples 1-7 and Comparative Examples 1-5 was superposed on the rubber sheet formed of the composition for the inner layer, and the superposed rubber sheets are vulcanized at 160° C. for 60 minutes so as to produce a test piece. Subsequently, each test piece was subjected to a 180-degree peel test wherein the pair of rubber sheets of the piece were pulled in opposite directions (that is, with 180 degree contained between the sheets). The test results are shown in a bottom portion of the TABLE.

TABLE (parts by weight)

| | INVENTION EXAMPLES | | | | | | | COMPARATIVE EXAMPLES | | | | |
|---|---|---|---|---|---|---|---|---|---|---|---|---|
| | 1 | 2 | 3 | 4 | 5 | 6 | 7 | 1 | 2 | 3 | 4 | 5 |
| NBR*1 | 95 | 90 | 70 | 50 | — | — | — | 100 | — | — | — | — |
| ACM | — | — | — | — | — | — | 70 | — | — | — | — | 100 |
| CHC*2 | 5 | 10 | 30 | 50 | 30 | 30 | 30 | — | 100 | — | — | — |
| CSM*3 | — | — | — | — | 70 | — | — | — | — | 100 | — | — |
| CPE*4 | — | — | — | — | — | 70 | — | — | — | — | 100 | — |
| SA*5 | 1 | 1 | 1 | 1 | 1 | — | 1 | 1 | 1 | 1 | — | 1 |
| ZnO | 5 | 5 | 5 | 5 | — | — | — | 5 | — | — | — | — |
| MgO | 5 | 5 | 5 | 5 | 10 | 10 | — | 5 | 5 | 10 | 10 | — |
| C *6 | 50 | 50 | 50 | 50 | 50 | 50 | 50 | 50 | 50 | 50 | 50 | 50 |
| Pla*7 | 15 | 15 | 15 | 15 | 15 | 15 | 15 | 15 | 15 | 15 | 15 | 15 |
| VA*8 | 3.3 | 3.3 | 3.3 | 3.3 | 2 | 3 | 1 | 3.3 | 1 | 2 | 3 | 1 |
| S *9 | 0.5 | 0.5 | 0.5 | 0.5 | — | — | — | 0.5 | — | — | — | — |
| PF*x | 6.0 | 10.1 | 13.2 | 14.0 | 12.6 | 11.0 | 13.7 | 4.4 | 6.8 | 4.0 | 2.7 | 5.3 |
| RF/IP | RF *y | RF | RF | RF | RF | RF | RF | IP *z | IP | IP | IP | IP |

*1 NBR containing 32% by weight of AN (acrylonitrile)
*2 epichlorohydrin-ethylene oxide-allyl glycidyl ether copolymer
*3 CSM containing 35% by weight of Cl
*4 CPE containing 35% by weight of Cl
*5 stearic acid
*6 FEF carbon
*7 plasticizer
*8 vulcanization accelerator
*9 sulfur
*x Pulling Force (kg/inch)
*y fracture of the rubber of the sheets of test piece
*z peeling at the interface between the rubber sheets of test piece As is apparent from the test results shown in the TABLE, all the test pieces formed of the compositions of Invention Examples 1–7 were not peeled at the interface between the pair of superposed rubber sheets thereof, but fractured in the (sheet) rubber. That is, the rubber sheets themselves were fractured. This means high bonding strength at the interface between the rubber sheets of the test pieces. On the other hand, the test pieces formed of the compositions of Comparative Examples 1–5 were peeled at the interface between the pair of superposed rubber sheets thereof. This means low bonding strength at the interface, as contrasted with the high bonding strength for Invention Examples 1–7. Thus, it is understood that the compositions prepared according to the present invention (Invention Examples 1–7), are more excellent as material for forming the inner layer of the inner rubber tube of rubber hoses, than comparative compositions 1–5.

What is claimed is:

1. A rubber hose having:
  an outer rubber tube and
  an inner rubber tube located radially inwardly of said outer rubber tube,
  said inner rubber tube comprising an inner layer and an outer layer located between said inner layer and said outer rubber tube,
  a reinforcing fiber layer disposed between said outer rubber tube and said outer layer of said inner rubber tube such that said inner and outer rubber tubes and said reinforcing fiber layer constitute an integral tubular body,
  said inner layer being formed of a first polymer blend of acrylic rubber and fluorine-contained resin, said acrylic rubber of said first polymer blend being a copolymer rubber produced by copolymerization of at least four monomers, said at least four monomers including at least one first monomer selected from a group consisting of alkyl acrylate and alkyl methacrylate, at least one second monomer selected from a group consisting of substituted-alkyl esters of acrylic acid and methacrylic acid, at least one third monomer selected from a group consisting of diene; acrylate containing dihydrodicyclopentadienyl radical and methacrylate containing dihydrodicyclopentadienyl radical; ethylenically unsaturated compound containing epoxy radical; and ethylenically unsaturated compound containing active halogen, and at least one fourth monomer selected from a group consisting of other ethylenically unsaturated compound capable of copolymerizing with said at least one first monomer, said at least one second monomer and said at least one third monomer,
  said outer layer being formed of a second polymer blend different from said first polymer blend, said second polymer blend containing epichlorohydrin rubber.

2. A rubber hose as set forth in claim 1, wherein said second polymer blend contains said epichlorohydrin rubber and at least one polymer selected from the group consisting of acrylonitrile-butadiene rubber, chlorosulfonated polyethylene, chlorinated polyethylene and acrylic rubber.

3. A rubber hose as set forth in claim 2, wherein said second polymer blend contains 1–50 parts by weight of said epichlorohydrin rubber per 100 parts by weight of the second polymer blend.

4. A rubber hose as set forth in claim 1, wherein said second polymer blend further contains at least one plasticizer, and acrylonitrile-butadiene rubber which contains, as a polymerization unit, 30–55% by weight of acrylonitrile, said polymer containing 15–80 parts by weight of said at least one plasticizer per 100 parts by weight of said acrylonitrile-butadiene rubber.

5. A rubber hose as set forth in claim 1, wherein said acrylic rubber of said first polymer blend consists of, as polymerization units thereof, 30–80% by weight of said at least one first material, 20–70% by weight of said at least one second monomer, 0.1–10% by weight of said at least one third monomer and 1–30% by weight of said at least one fourth monomer.

6. A rubber hose as set forth in claim 1, wherein said fluorine-contained resin of said first polymer blend comprise polyvinyl fluoride, polyvinylidene fluoride, tetrafluoroethylene-hexafluoroethylene copolymer, polytetrafluoroethylene and ethylene-tetrafluoroethylene copolymer.

* * * * *